(12) United States Patent
Shinohara et al.

(10) Patent No.: US 11,674,661 B2
(45) Date of Patent: Jun. 13, 2023

(54) METHOD FOR MANUFACTURING LIGHT GUIDING PLATE, LIGHT GUIDING PLATE, AND LIGHTING TOOL FOR VEHICLE

(71) Applicant: OMRON Corporation, Kyoto (JP)

(72) Inventors: Masayuki Shinohara, Nagaokakyo (JP); Ryo Yamamoto, Kyoto (JP); Norikazu Kitamura, Osaka (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/431,342

(22) PCT Filed: Mar. 9, 2020

(86) PCT No.: PCT/JP2020/010107
§ 371 (c)(1),
(2) Date: Aug. 16, 2021

(87) PCT Pub. No.: WO2020/179936
PCT Pub. Date: Sep. 10, 2020

(65) Prior Publication Data
US 2022/0154908 A1 May 19, 2022

(30) Foreign Application Priority Data
Mar. 7, 2019 (JP) .............................. JP2019-041962

(51) Int. Cl.
*F21S 43/245* (2018.01)
*F21S 43/239* (2018.01)
(Continued)

(52) U.S. Cl.
CPC .......... *F21S 43/245* (2018.01); *B60Q 1/0011* (2013.01); *F21S 43/239* (2018.01);
(Continued)

(58) Field of Classification Search
CPC .............................. F21S 43/241; F21S 43/235
See application file for complete search history.

(56) References Cited

U.S. PATENT DOCUMENTS

2006/0006559 A1  1/2006  Nakagawa et al.
2006/0269213 A1* 11/2006  Hwang .............. H04N 1/02835
                                                    385/146
(Continued)

FOREIGN PATENT DOCUMENTS

CN          1719315 A      1/2006
DE     102007009583 A1     8/2008
(Continued)

OTHER PUBLICATIONS

Chinese Office Action dated Aug. 19, 2022 in a counterpart Chinese patent application.
(Continued)

*Primary Examiner* — Eric T Eide
(74) *Attorney, Agent, or Firm* — Metrolex IP Law Group, PLLC

(57) ABSTRACT

A method is disclosed for manufacturing, by injection molding with use of a mold, a light guide plate in which a first region having a curvature in a first direction and a second region having a predetermined curved surface are connected. The mold includes a first member for forming the first region and a second member for forming the second region. The first member is manufactured by bending a first electroforming stamper on which a predetermined structure is formed by electroforming in a direction corresponding to the first direction.

20 Claims, 5 Drawing Sheets

(51) Int. Cl.
    *B60Q 1/00*        (2006.01)
    *F21Y 115/10*      (2016.01)
    *F21W 103/35*      (2018.01)
    *F21V 8/00*        (2006.01)

(52) U.S. Cl.
    CPC ......... *G02B 6/0045* (2013.01); *G02B 6/0065* (2013.01); *F21W 2103/35* (2018.01); *F21Y 2115/10* (2016.08)

(56) References Cited

U.S. PATENT DOCUMENTS

| | | | |
|---|---|---|---|
| 2011/0149585 A1* | 6/2011 | Dubosc | F21V 13/10 362/519 |
| 2012/0013038 A1 | 1/2012 | Stege | |
| 2014/0247616 A1* | 9/2014 | Arrivet | B60Q 1/0052 362/511 |
| 2015/0069224 A1* | 3/2015 | Yoshimura | G02B 5/04 250/227.14 |
| 2017/0217362 A1 | 8/2017 | Fritz et al. | |
| 2018/0065548 A1 | 3/2018 | Fries et al. | |
| 2018/0370418 A1 | 12/2018 | Shinohara et al. | |
| 2020/0122630 A1 | 4/2020 | Fritz et al. | |

FOREIGN PATENT DOCUMENTS

| | | |
|---|---|---|
| EP | 2965947 A1 | 1/2016 |
| EP | 3095642 A1 | 11/2016 |
| GB | 9827821 | 2/1999 |
| JP | 2000-153543 A | 6/2000 |
| JP | 2003-123513 A | 4/2003 |
| JP | 2009-155710 A | 7/2009 |
| JP | 4530428 B1 | 8/2010 |
| JP | 2013-125685 A | 6/2013 |
| JP | 2017220394 A | 12/2017 |
| JP | 2019-009100 A | 1/2019 |

OTHER PUBLICATIONS

Japanese Office Action dated May 17, 2022 for the counterpart Japanese patent application.
German Office Action dated Oct. 14, 2022 in a counterpart German patent application.
English translation of the International Search Report ("ISR") of PCT/JP2020/010107 dated May 26, 2020.
Written Opinion("WO") of PCT/JP2020/010107 dated May 26, 2020.

* cited by examiner

METHOD FOR MANUFACTURING LIGHT
GUIDING PLATE, LIGHT GUIDING PLATE,
AND LIGHTING TOOL FOR VEHICLE

TECHNICAL FIELD

The disclosure relates to a method for manufacturing a light guide plate having a free-form surface on an end surface.

BACKGROUND ART

A light guide plate for guiding light to a lighting device, a stereoscopic image display device, or the like is used. A method for manufacturing such a light guide plate is known as a conventional technique.

For example, Patent Document 1 discloses a method for manufacturing a light guide plate curved to have a predetermined curvature radius. In a technique disclosed in Patent Document 1, a light guide plate substrate is heated to have a curvature of a predetermined curvature radius.

PRIOR ART DOCUMENT

Patent Document

Patent Document 1: Japanese Patent No. 4530428

SUMMARY

Here, a stereoscopic display device including a light guide plate may be used as a tail lamp unit of a vehicle. Such a tail lamp unit includes the light guide plate and a cover that protects the light guide plate. It may be preferable that the tail lamp unit has a curvature in two axial directions, namely, up-down direction and a left-right direction in order to conform to a shape of a casing of the vehicle for enhancing a design.

Of the light guide plate and the cover, the cover easily has a shape having a curvature in two axial directions, namely, the up-down direction and the left-right direction. On the other hand, the light guide plate needs to be provided with an optical path changer that changes an optical path of light emitted from a light source. However, in the technique disclosed in Patent Document 1, the light guide plate substrate, which is heated to have a curvature of a predetermined curvature radius, can have a curvature only in one axial direction.

A method for manufacturing a light guide plate according to one or more embodiments is disclosed that may be capable of manufacturing a light guide plate having a predetermined curved surface in a part of a region.

A method for manufacturing a light guide plate according to one or more embodiments may include a method for manufacturing a light guide plate by injection molding with use of a mold, the light guide plate including (1) a first region that has a curvature in a first direction, guides light emitted from a light source and incident from an incident surface, redirects the guided light by an optical path changer to thereby emit the guided light from an exit surface, and forms an image in a space and (2) a second region that has a predetermined curved surface, in which the mold includes a first member forming the first region and a second member forming the second region, the first member is manufactured by bending a first electroforming stamper on which a predetermined structure is formed by electroforming in a direction corresponding to the first direction, the second member is manufactured to form the predetermined curved surface, and the light guide plate is manufactured by injection molding with use of the mold in which the first member and the second member are connected.

A light guide plate having a predetermined curved surface in a part of a region may be manufactured.

DETAILED DESCRIPTION

First Embodiment

Hereinafter, one or more embodiments (hereinafter, also referred to as "the embodiment") according to an aspect of the invention will be described with reference to the drawings.

§ 1 APPLICATION EXAMPLE

First, an example of a method for manufacturing a light guide plate of the invention will be described with reference to FIGS. 6 and 7.

Figure 6:
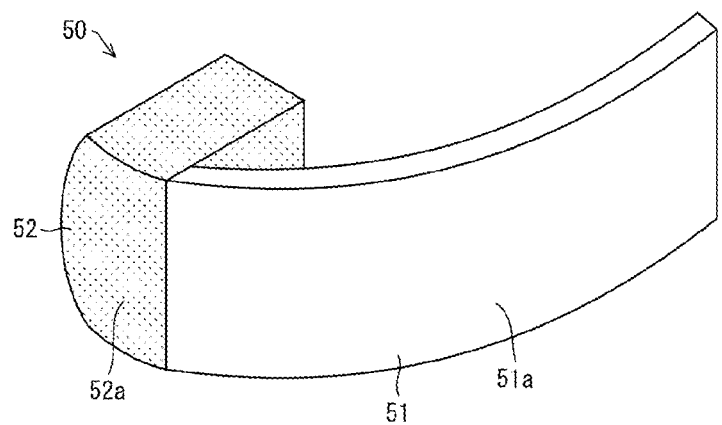
FIG. 6 is a diagram illustrating a perspective view of a mold used for manufacturing a light guide plate.

FIG. 6 is a perspective view of a mold 50. The drawing is a diagram illustrating a configuration of an injection molder 100 performing injection molding for manufacturing a light guide plate 10. The drawing is a diagram illustrating a configuration of the injection molder 100 performing injection molding for manufacturing the light guide plate.

This example is a method for manufacturing, by injection molding with use of a mold, a light guide plate in which a first region having a curvature in a first direction (direction having axes in a horizontal direction and an up-down direction) and a second region having a free-form surface with an undefined axis of curvature are connected.

As illustrated in FIG. 6, the mold 50 includes a first member 51 and a second member 52. The first member 51 is an electroforming stamper used to form a region corresponding to a stereoscopic image former of the light guide plate. The first member 51 is formed to have a predetermined curvature in one axis direction (horizontal direction). On the other hand, the second member 52 is formed with use of a mold part so as to have a free-form surface.

Figure 7:
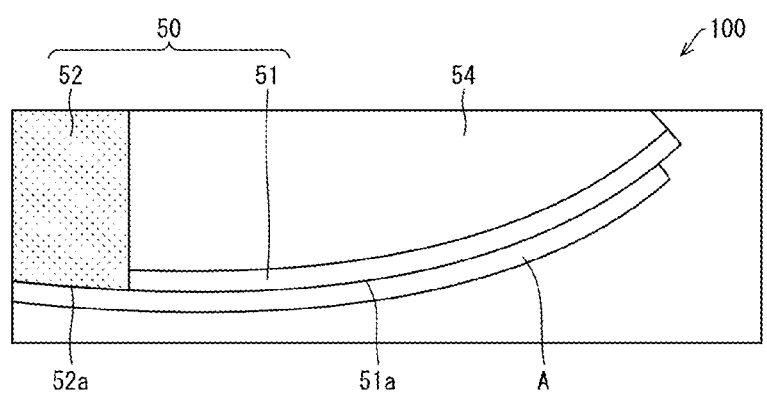
FIG. 7 is a diagram illustrating a configuration of an injection molder for performing injection molding for manufacturing a light guide plate.

As illustrated in FIG. 7, in the mold 50, the first member 51 and the second member 52 attached to a base 54 are connected such that a curved surface 51a and a curved surface 52a are flush with each other. In the injection molder 100, a region A for molding the light guide plate 10 is formed in front of a surface configured by the curved surface 51a and the curved surface 52a.

In the method for manufacturing the light guide plate 10 in this example, the light guide plate is manufactured by injection molding with use of a mold including the first member 51 having a curvature in the first direction and the second member 52 having a free-form surface as a predetermined curved surface. As a result, in the light guide plate to be manufactured, (1) it is possible to form the stereoscopic image former including an optical path changer group required to be molded with high accuracy in a region corresponding to the first member 51, and (2) it is possible to form the region having the free-form surface in a region corresponding to the second member 52.

§ 2 CONFIGURATION EXAMPLE

Hereinafter, a configuration of a tail lamp unit 1A (lighting tool for vehicle) of the invention and a method for manufacturing the light guide plate 10 included in the tail lamp unit 1A will be described with reference to the drawings.

(Configuration of Tail Lamp Unit 1A)

Figure 1:
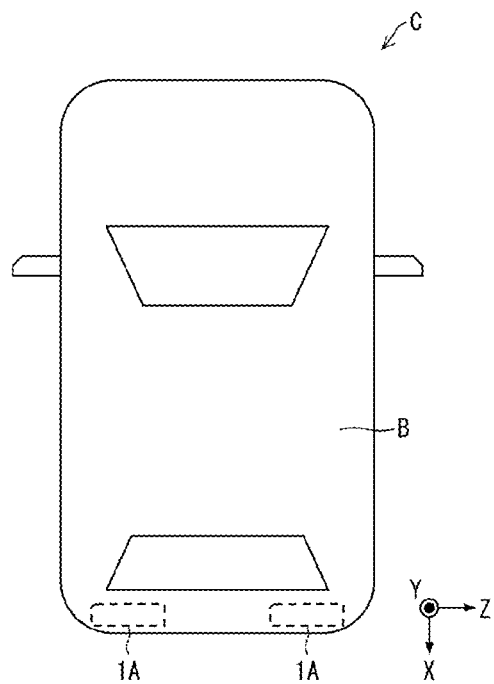
FIG. 1 is a diagram illustrating a top view of a vehicle provided with a tail lamp unit according to one or more embodiments.

FIG. 1 is a top view of a vehicle C provided with the tail lamp unit 1A according to the embodiment. Hereinafter, for convenience of description, in FIG. 1, a positive X direction may be referred to as a rear direction, a negative X direction may be referred to as a front direction, a positive Y direction may be referred to as an upper direction, a negative Y direction may be referred to as a lower direction, a positive Z direction may be referred to as a right direction, and a negative Z direction may be referred to as a left direction. As illustrated in FIG. 1, the tail lamp units 1A are provided on the left and right of a rear part of the vehicle C, respectively.

Figure 2:
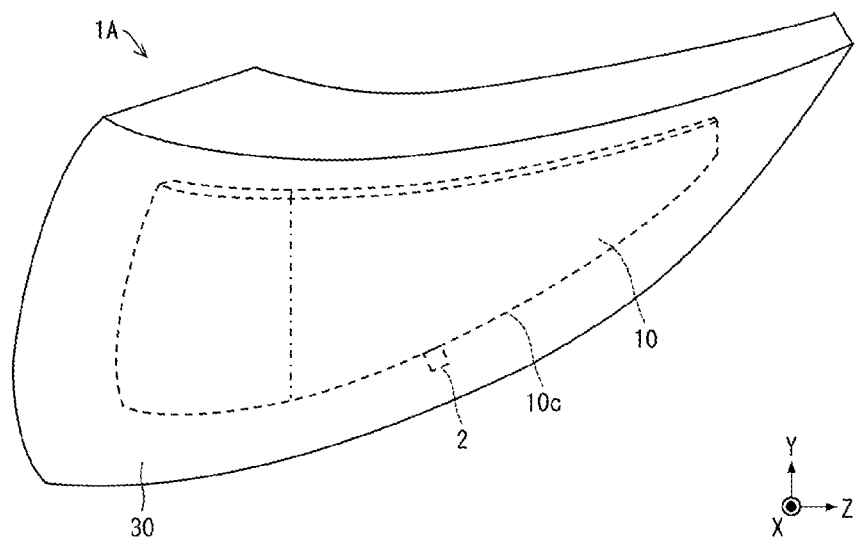
FIG. 2 is a diagram illustrating a configuration of a tail lamp unit on a right side of a vehicle.
Figure 3:
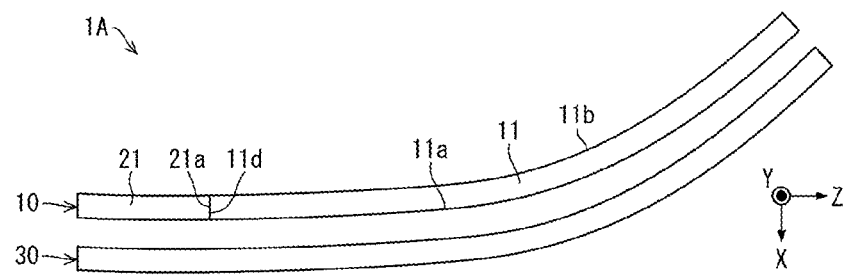
FIG. 3 is a diagram of illustrating a tail lamp unit as viewed from above.

FIG. 2 is a diagram illustrating a configuration of the tail lamp unit 1A on the right side of the vehicle C. FIG. 3 is a diagram of the tail lamp unit 1A as viewed from above. Note that the configuration of the tail lamp unit 1A on the left side of the vehicle C is the same as that of the tail lamp unit 1A on the right side of the vehicle C except that the tail lamp unit 1A on the left side of the vehicle C is bilaterally symmetrical with the tail lamp unit 1A on the right side of the vehicle C.

As illustrated in FIGS. 2 and 3, the tail lamp unit 1A includes a light source 2, the light guide plate 10, and a cover 30. The light source 2 and the light guide plate 10 form a stereoscopic image showing a tail lamp and a brake lamp of the vehicle C.

The light source 2 emits light to the light guide plate 10. The light source 2 is, for example, a light emitting diode (LED) light source. The light source 2 is installed on an end surface 10c as a lower surface of the light guide plate 10.

The light guide plate 10 guides the light emitted from the light source 2, redirects the guided light by an optical path changer to be described later to thereby form a stereoscopic image in a space.

Figure 4:
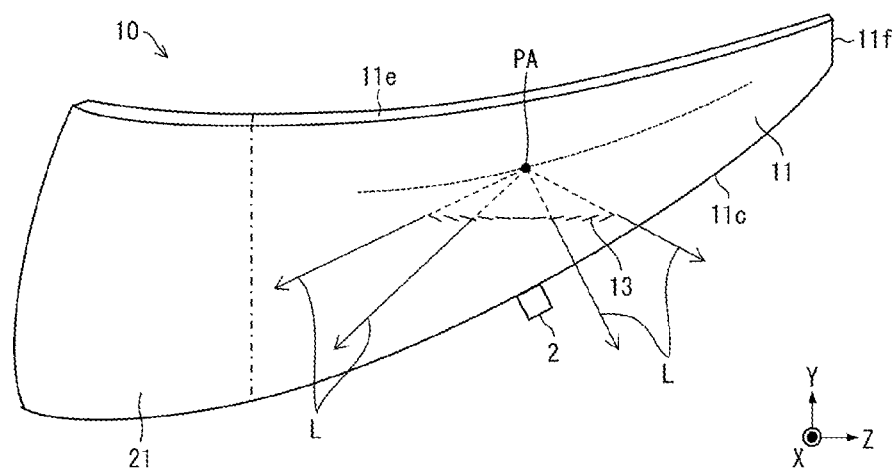
FIG. 4 is a diagram illustrating a configuration of a light guide plate included in a tail lamp unit.

FIG. 4 is a diagram illustrating a configuration of the light guide plate 10. As illustrated in FIGS. 3 and 4, the light guide plate 10 includes a stereoscopic image former 11 (first region) and an auxiliary member 21 (second region). The light guide plate 10 includes a resin material having transparency and a relatively high refractive index. The material forming the light guide plate 10 may be, for example, polycarbonate resin, polymethyl methacrylate resin, glass, or the like.

The stereoscopic image former 11 is a region where the optical path changer for forming a stereoscopic image is formed, and is a member constituting the right side of the light guide plate 10. The stereoscopic image former 11 has a curvature in the left-right direction, but does not have a curvature in the up-down direction.

The stereoscopic image former 11 includes an exit surface 11a that emits light, a rear surface 11b opposite to the exit surface 11a, and an end surface 11c, an end surface 11d, an end surface 11e, and an end surface 11f that are surfaces connecting the exit surface 11a and the rear surface 11b. The end surface 11c is an incident surface on which the light emitted from the light source 2 is incident on the stereoscopic image former 11. The stereoscopic image former 11 guides the light from the light source 2 while expanding the light in a Z-axis direction between the exit surface 11a and the rear surface 11b.

A plurality of optical path changer groups 13 is formed on the rear surface 11b of the stereoscopic image former 11. The optical path changer groups 13 are formed substantially continuously in the horizontal direction. The optical path changer groups 13 are each formed by a part of a Fresnel lens. FIG. 4 illustrates only one optical path changer group 13 for simplification. The light emitted from the light source 2 and guided by the stereoscopic image former 11 is incident on each position in the Z-axis direction of the optical path changer group 13. The optical path changer group 13 changes an optical path of the light incident on each position of the optical path changer group 13 to a direction substantially diverging from a fixed point (hereinafter, referred to as a convergence point PA) corresponding to each optical path changer group 13. The light reflected at a certain point of the optical path changer group 13 travels in a direction along a straight line connecting the point and the convergence point PA. A divergent light L that has been redirected by the optical path changer group 13 is emitted from the exit surface 11a of the stereoscopic image former 11 toward outside of the vehicle C.

Figure 5:
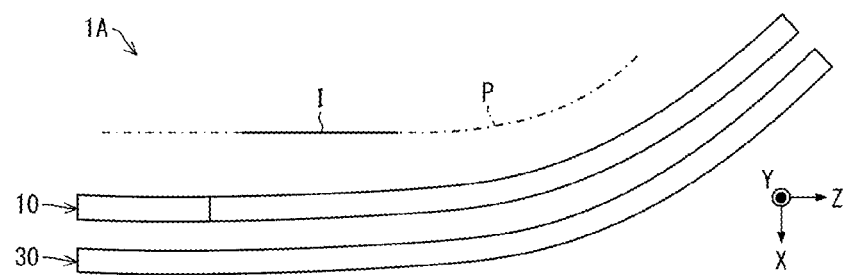
FIG. 5 is a diagram illustrating a stereoscopic image formed by a stereoscopic image former in a light guide plate.

FIG. 5 is a diagram illustrating a stereoscopic image I formed by the stereoscopic image former 11. As described above, the plurality of optical path changer groups 13 is formed in the stereoscopic image former 11, and convergence points of the plurality of optical path changer groups 13 are different from each other. As a result, in the stereoscopic image former 11, as illustrated in FIG. 5, a virtual image as the stereoscopic image I is formed on the stereoscopic image forming plane P by a collection of a plurality of convergence points corresponding to the optical path changer groups 13. That is, the stereoscopic image I formed by the light emitted from the stereoscopic image former 11 functions as a tail lamp and a brake lamp of the vehicle C.

The auxiliary member 21 is a member for improving a design of the tail lamp unit 1A. As illustrated in FIGS. 3 and 4, the auxiliary member 21 is a member constituting the left side of the light guide plate 10. The stereoscopic image former 11 of the auxiliary member 21 has a free-form surface. A left end of the auxiliary member 21 has a curved surface to match a shape of a casing B of the vehicle C. As illustrated in FIG. 5, the light guide plate 10 is formed such that the auxiliary member 21, a right side surface 21*a*, and the end surface 11*d* of the stereoscopic image former 11 are connected.

The cover 30 is a member that protects the light source 2 and the light guide plate 10, and is installed outside of the light source 2 and the light guide plate 10 in the vehicle C. A left end of the cover 30 has a curved surface to match the shape of the casing B of the vehicle C. The cover 30 includes a material having transparency.

The cover 30 is constituted by a smooth curved surface (in other words, a continuous curved surface). In other words, the cover 30 does not have a protrusion, a bent portion, or the like that causes a discontinuous curved surface. As a result, the light emitted from the stereoscopic image former 11 is not deflected in an unintended direction, and this can prevent the stereoscopic image I to be formed from being unclear.

Here, for example, a case where the left end of the light guide plate does not have a curved surface but a flat surface will be described. In this case, a connection surface between the casing B of the vehicle C and the cover is a curved surface, while a connection surface between the casing B of the vehicle C and the light guide plate is a flat surface. This causes a problem of poor appearance of the vehicle C.

On the other hand, in the tail lamp unit 1A, the left ends of the light guide plate 10 and the cover 30 have curved surfaces so as to match the shape of the casing B of the vehicle C. As a result, both the connection surface between the casing B of the vehicle C and the cover and the connection surface between the casing B of the vehicle C and the light guide plate are curved surfaces. This can enhance a design of the vehicle C.

(Method of Manufacturing Light Guide Plate 10)

The light guide plate 10 of the invention is manufactured by injection molding with use of a mold that is molded in a predetermined shape.

FIG. 6 is a perspective view of the mold 50 used in the embodiment. As illustrated in FIG. 6, the mold 50 includes a first member 51 and a second member 52.

The first member 51 is an electroforming stamper (first electroforming stamper) used to form a region corresponding to the stereoscopic image former 11 of the light guide plate 10. A method for manufacturing the first member 51 is as follows. First, an electroforming stamper in which a structure for forming the optical path changer group 13 included in the stereoscopic image former 11 is formed on a metal flat plate by electroforming is produced. Next, the produced electroforming stamper is heated to form the electroforming stamper so as to have a predetermined curvature in the first direction (direction corresponding to the left-right direction of the vehicle C). Thus, the first member 51 having the curved surface 51*a* on which the structure is formed is manufactured.

The second member 52 is a member used to form a region corresponding to the stereoscopic image former 11 of the light guide plate 10. The second member 52 does not need a structure for forming the optical path changer group 13, which is required to be formed with high accuracy. Thus, the second member 52 can be formed by a method other than electroforming. Therefore, the second member 52 can be easily formed by using a mold part so as to have a free-form surface. The curved surface 52*a*, which is a surface used for injection molding of the second member 52, is mirror-finished.

FIG. 7 is a diagram illustrating a configuration of the injection molder 100 for performing injection molding for manufacturing the light guide plate 10. As illustrated in FIG. 7, in the mold 50, the first member 51 and the second member 52 attached to a base 54 are connected such that a curved surface 51*a* and a curved surface 52*a* are flush with each other. In the injection molder 100, a region A for molding the light guide plate 10 is formed in front of a surface configured by the curved surface 51*a* and the curved surface 52*a*. The light guide plate 10 can be formed by using a known injection molding technique with use of the injection molder 100.

As described above, in the method for manufacturing the light guide plate 10 in the embodiment, the light guide plate is manufactured by injection molding with use of a mold including the first member 51 having a curvature in the horizontal direction and the second member 52 having a free-form surface. In the above configuration, (1) in the region corresponding to the first member 51, the stereoscopic image former 11 including the optical path changer group 13 required to be molded with high accuracy can be formed, and (2) in the region corresponding to the second member 52, the auxiliary member 21 conforming to the shape of the casing B of the vehicle C can be formed by having the free-form surface.

Here, it is technically possible to produce an electroforming stamper having a free-form surface and having a structure for forming the optical path changer group 13. However, in order to produce such an electroforming stamper, there is a problem that electroforming is difficult to reproduce, and a manufacturing cost is high.

On the other hand, in the method for manufacturing the light guide plate 10 in the embodiment, the first member 51 in which the structure for forming the optical path changer group 13 is formed needs to have the curvature only in the horizontal direction. Therefore, a manufacturing cost of the first member 51 (eventually, the light guide plate 10) can be suppressed.

In the light guide plate 10 in the embodiment, only one side in the left-right direction has the free-form surface, but the light guide plate 10 of the invention is not limited to this configuration. In the light guide plate 10 according to an aspect of the invention, both sides in the left-right direction may have free-form surfaces. Such a light guide plate can be manufactured by using a mold in which the second member 52 is disposed on both sides of the first member 51.

The auxiliary member 21 in the embodiment has a free-form surface, but may have a curvature in the up-down direction and the horizontal direction, or may have a curvature in a direction other than the up-down direction and the horizontal direction. The second member 52 can be produced without performing high-precision control to form a structure for forming the optical path changer group 13. Therefore, the second member 52 can have an arbitrary curved surface.

The light guide plate 10 in the embodiment is a light guide plate that guides light incident from the light source 2 and emits the light from the exit surface 11*a*. The light guide plate 10 includes the stereoscopic image former 11 that has a curvature in the first direction, guides the light emitted from the light source 2 and incident from the incident surface 11*c*, redirects the guided light, by the optical path changer group 13, to thereby emit the guided light from the exit surface 11*a*, and forms an image in a space, and the auxiliary member 21 that is connected to one end of the stereoscopic image former 11 in a direction in which the stereoscopic image former 11 has a curvature (that is, the first direction) and has a predetermined curved surface.

In the above configuration, the left end of the light guide plate 10 has a curved surface so as to match the shape of the casing B of the vehicle C. As a result, both the connection surface between the casing B of the vehicle C and the cover and the connection surface between the casing B of the vehicle C and the light guide plate 10 are curved surfaces. This can enhance a design of the vehicle C.

§ 3 MODIFICATIONS

Although the embodiment of the invention has been described in detail above, the above description is merely an example of the invention in all respects. It goes without saying that various improvements and modifications can be made without departing from the scope of the invention. For example, the following modifications are possible. In the following description, the same symbols are used for the same components as those of the above embodiment, and the description of the same points as those of the above embodiment is appropriately omitted. The following modifications can be appropriately combined.

<4.1>

The method for manufacturing the light guide plate 10 in the embodiment is similar to the method in the first embodiment except that a mold 60 is used instead of the mold 50 in the first embodiment.

Figure 8:
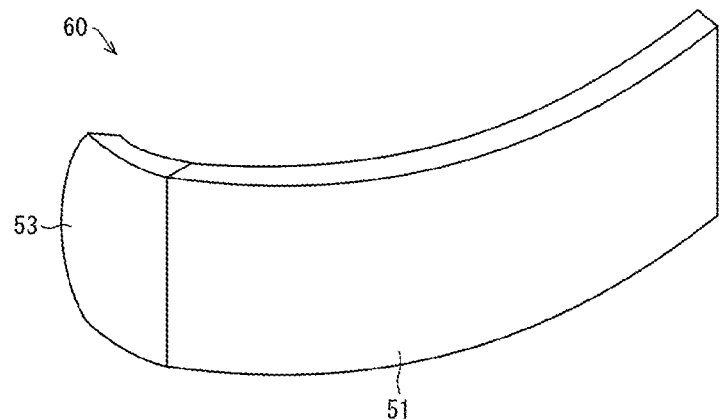
FIG. 8 is a diagram illustrating a configuration of a mold as a modification of a mold.

FIG. 8 is a diagram illustrating a configuration of the mold 60 according to the modification. As illustrated in FIG. 8, the mold 60 includes a second member 53 instead of the second member 52 in the first embodiment.

The second member 53 is an electroforming stamper (second electroforming stamper) used to form a region corresponding to the stereoscopic image former 11 of the light guide plate 10. The second member 53 does not need a structure for forming the optical path changer group 13, which is required to be formed with high accuracy. Thus, the second member 53 is manufactured by being bent in two axial directions by heating an electroforming stamper produced by electroforming. The two axial directions are the first direction and a direction different from the first direction. For example, the two axial directions may be the up-down direction and the left-right direction, or may be other directions. Further, the two axes may have any angle that is not perpendicular to each other.

When the light guide plate 10 is applied to the tail lamp unit 1A as described above, it is sufficient that a curvature radius is equal to or more than 500 mm in the up-down direction of the vehicle C, and the curvature radius is equal to or more than 200 mm in the horizontal direction of the vehicle C.

As described above, in the method for manufacturing the light guide plate 10 of the modification, the second member 53 used to form the region corresponding to the auxiliary member 21 of the light guide plate 10 is the electroforming stamper. As a result, the first member 51 and the second member 53 can be manufactured by the electroforming stamper without requiring a mold part having a free-form surface, and thus the manufacturing cost of the light guide plate can be suppressed.

<4.2>

When the light guide plate 10 is manufactured by the manufacturing method in the first embodiment, a ridgeline 15 caused by a ridgeline between the first member 51 and the second member 52 in the mold 50 may be formed on the surface of the light guide plate 10 configured by the curved surface 51a and the curved surface 52a. Therefore, in the modification, a tail lamp unit capable of making the ridgeline 15 inconspicuous will be described.

Figure 9:
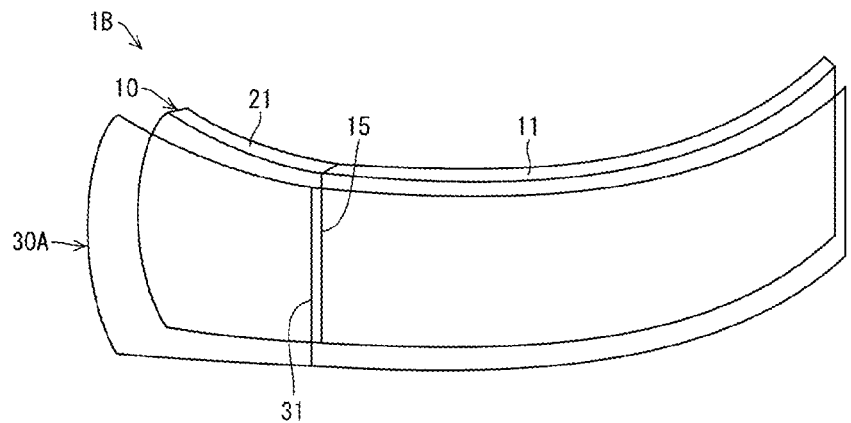
FIG. 9 is a diagram illustrating a configuration of a modification of a tail lamp unit.
Figure 10:
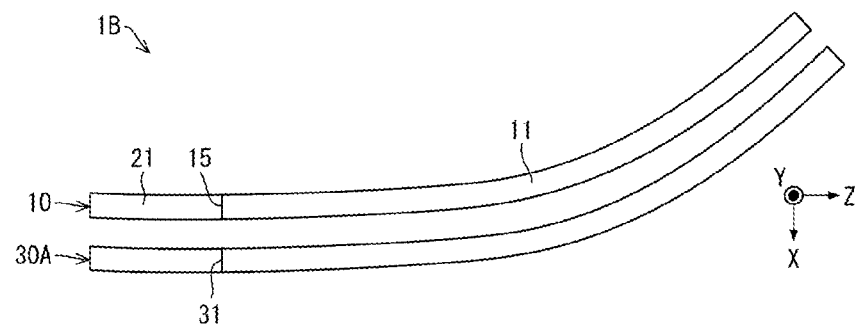
FIG. 10 is a diagram illustrating a tail lamp unit as viewed from above.

FIG. 9 is a diagram illustrating a configuration of a tail lamp unit 1B as a modification of the tail lamp unit 1A in the first embodiment. FIG. 10 is a diagram of the tail lamp unit 1B as viewed from above. As illustrated in FIGS. 9 and 10, the tail lamp unit 1B includes a cover 30A instead of the cover 30 in the first embodiment. The cover 30 includes a bent portion 31 in addition to the configuration of the cover 30 in the first embodiment.

Figure 11A:
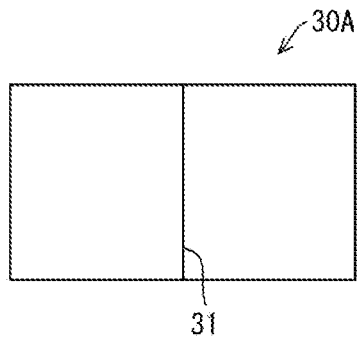
FIG. 11A and FIG. 11B are diagrams illustrating specific examples of a bent portion provided in a tail lamp unit.
Figure 11B:
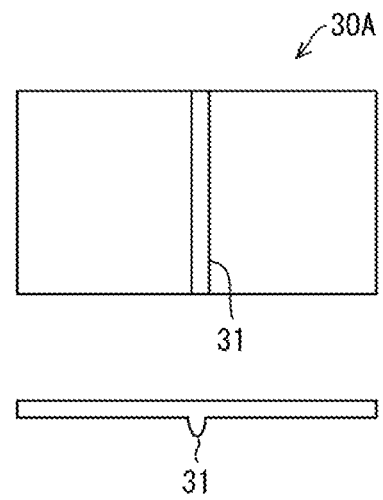

FIG. 11A and FIG. 11B are diagrams illustrating specific examples of the bent portion 31. As illustrated in FIG. 11A, the bent portion 31 may be a line for dividing the cover 30A into two. As illustrated in FIG. 11B, the bent portion 31 may have a continuously bent structure. In this case, the bent portion 31 may have a protruding structure that protrudes toward outside of the vehicle C or a recessed structure that is recessed toward inside of the vehicle C.

As illustrated in FIG. 10, the bent portion 31 is provided at a position overlapping the ridgeline 15 formed on the light guide plate 10 when the tail lamp unit 1B is viewed from the rear direction. Accordingly, when the ridgeline 15 is formed on the light guide plate 10, the ridgeline 15 can be made inconspicuous.

<4.3>

Figure 12:
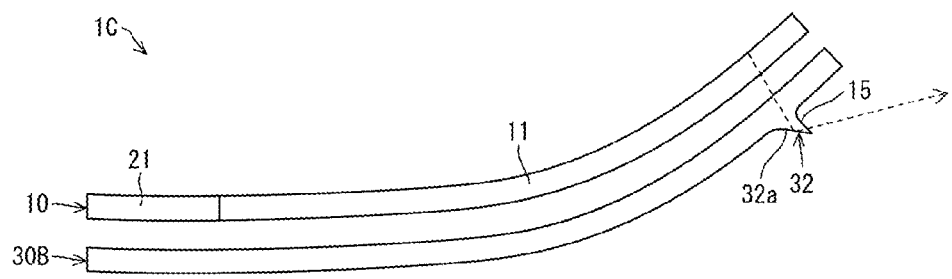
FIG. 12 is a diagram illustrating a configuration of another modification of a tail lamp unit.

FIG. 12 is a diagram illustrating a configuration of a tail lamp unit 1C as a modification of the tail lamp unit 1A in the first embodiment. As illustrated in FIG. 12, the tail lamp unit 1C includes a cover 30B instead of the cover 30 in the first embodiment. The cover 30B includes a reflecting surface 32 in the configuration of the cover 30 in the first embodiment.

The reflecting surface 32 is formed on an outer surface 30Ba of the cover 30B. The reflecting surface 32 is a surface that reflects the light emitted from the exit surface 11a of the light guide plate 10 so as to deflect a traveling direction of the light to a larger angle with respect to the front-rear direction of the vehicle C.

In the above configuration, the light emitted from the exit surface 11a of the light guide plate 10 can be deflected in a direction forming a larger angle with respect to the front-rear direction of the vehicle C. As a result, the stereoscopic image I can be visually recognized in a wider viewing angle range.

<4.4>

Figure 13:
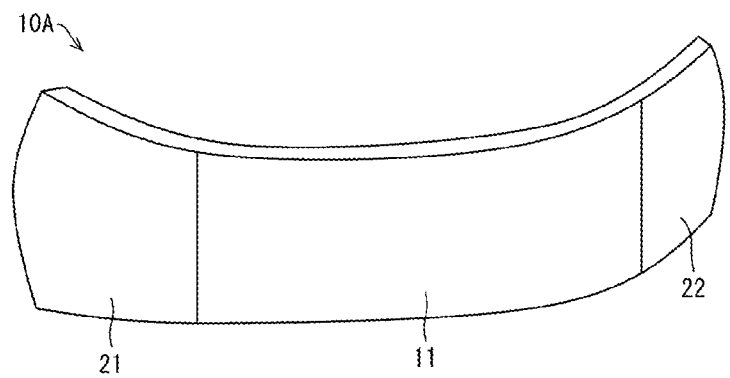
FIG. 13 is a diagram illustrating a configuration of a modification of a light guide plate.

FIG. 13 is a view illustrating a configuration of a light guide plate 10A as a modification of the light guide plate 10 in the first embodiment. As illustrated in FIG. 13, the light guide plate 10A includes the stereoscopic image former 11 (first region), the auxiliary member 21 (second region), and the auxiliary member 22 (second region). In the light guide plate 10 according to the first embodiment, the auxiliary member 21 is connected only to one end of the stereoscopic image former 11 (first region). Specifically, the auxiliary member 21 is connected to only one end of the stereoscopic image former 11 in a direction in which the stereoscopic image former 11 has a curvature. On the other hand, in the light guide plate 10A in the modification, the auxiliary member 21 and the auxiliary member 22 are formed at both ends of the stereoscopic image former 11 in a direction in which the stereoscopic image former 11 has a curvature.

Figure 14:
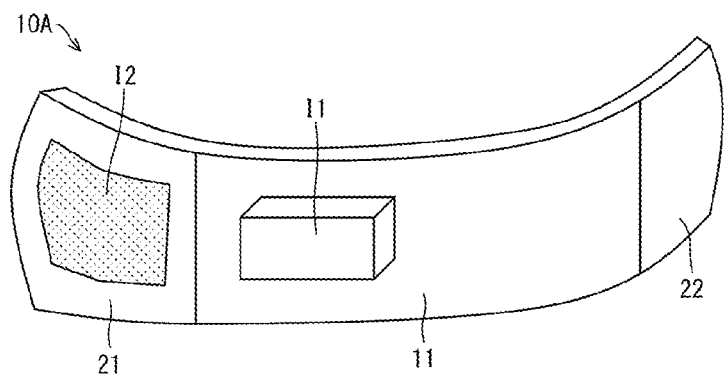
FIG. 14 is a diagram illustrating a state in which an image is formed by a light guide plate.

FIG. 14 is a diagram illustrating a state in which an image is formed by the light guide plate 10A. As illustrated in FIG. 14, in the light guide plate 10A, the optical path changer is also formed in the auxiliary member 21. Further, in the light guide plate 10A, in addition to an image I1 formed by the stereoscopic image former 11, the light emitted from the light source 2, passing through the stereoscopic image former 11, and entering the auxiliary member 21 is redirected by the optical path changer formed in the auxiliary member 21, and thus an image I2 is formed. In the modification, the image I2 is formed on the exit surface 21A of the auxiliary member 21, but the image I2 may be formed in other spaces.

As described above, the auxiliary member 21 is formed by using the mold part, the formation accuracy of the optical path changer formed in the auxiliary member 21 cannot be improved as compared with a case where the optical path changer is formed in the stereoscopic image former 11. Thus, a density of the optical path changer included in the auxiliary member 21 is smaller than a density of the optical path changer included in the stereoscopic image former 11. In the light guide plate 10A in the modification, the density of the optical path changer included in the auxiliary member 21 is equal to or less than 50% of the density of the optical path changer included in the stereoscopic image former 11. In the light guide plate 10A of the modification, a pattern shape of the optical path changer included in the stereoscopic image former 11 is different from a pattern shape of the optical path changer included in the auxiliary member 21.

The auxiliary member 22 can be formed in a similar manner as the method for forming the auxiliary member 21 described in the first embodiment.

[Summary]

A method for manufacturing a light guide plate according to an aspect of the invention is a method for manufacturing a light guide plate by injection molding with use of a mold, the light guide plate including (1) a first region that has a curvature in a first direction, guides light emitted from a light source and incident from an incident surface, redirects the guided light by an optical path changer to thereby emit the guided light from an exit surface, and forms an image in a space and (2) a second region that has a predetermined curved surface, in which the mold includes a first member forming the first region and a second member forming the second region, the first member is manufactured by bending a first electroforming stamper on which a predetermined structure is formed by electroforming in a direction corresponding to the first direction, the second member is manufactured to form the predetermined curved surface, and the light guide plate is manufactured by injection molding with use of the mold in which the first member and the second member are connected.

In the above configuration, it is possible to manufacture the light guide plate including the first region bent in a uniaxial direction and formed by a region corresponding to the first member of the mold and the second region having the predetermined curved surface and formed by a region corresponding to the second member of the mold.

In the method for manufacturing the light guide plate according to an aspect of the invention, the second member is manufactured by a mold part including a surface for forming the predetermined curved surface.

In the above configuration, the second member can be manufactured to have an arbitrary free-form surface.

In the method for manufacturing a light guide plate according to an aspect of the invention, the second member is manufactured by bending a second electroforming stamper formed by electroforming in the first direction and a direction different from the first direction.

The above configuration eliminates the need for the mold part for forming an arbitrary curved surface, and can suppress a manufacturing cost of the light guide plate.

The light guide plate according to an aspect of the invention is manufactured by any one of the above manufacturing methods.

In the above configuration, the second region having the predetermined curved surface is provided, and thus the light guide plate can be adapted to a shape of a device or the like having the light guide plate.

A lighting tool for vehicle according to an aspect of the invention includes the light guide plate, a light source configured to emit light to the light guide plate, and a cover protecting the light guide plate and the light source.

In the above configuration, a shape of a connection surface between the light guide plate and a casing of a vehicle and a shape of a connection surface between the cover and the casing of the vehicle can be both curved surfaces. This can enhance design of the vehicle.

A light guide plate according to an aspect of the invention is a light guide plate that guides light incident from a light source and emits the light from an exit surface, the light guide plate including a first region that has a curvature in a first direction, guides light emitted from the light source and incident from an incident surface, redirects the guided light by an optical path changer to thereby emit the guided light from the exit surface, and forms an image in a space, and a second region that is connected to at least one end of the first region in a direction in which the first region has a curvature, and that has a predetermined curved surface.

In the light guide plate according to an aspect of the invention, the second region includes an optical path changer that redirects the light, which is emitted from the light source and incident from the incident surface, to thereby emit the light from the exit surface, and forms an image in a space, and the optical path changer included in the second region has a density that is equal to or less than 50% of a density of the optical path changer included in the first region.

In the light guide plate according to an aspect of the invention, the light redirected by the optical path changer included in the second region forms an image on the exit surface of the second region.

The invention is not limited to the above embodiments, and various modifications can be made within the scope indicated in the claims, and embodiments obtained by appropriately combining technical means disclosed in different embodiments are also included in the technical scope of the invention.

DESCRIPTION OF SYMBOLS 1A, 1B, 1C tail lamp unit (lighting tool for vehicle)
2 light source
10, 10A light guide plate
11 stereoscopic image former (first region)
11a exit surface
13 optical path changer group
21 auxiliary member (second region)
30, 30A, 30B cover
50, 60 mold
51 first member
52, 53 second member

The invention claimed is:

1. A method for manufacturing a light guide plate by injection molding with use of a mold, the light guide plate including a first region that has a curvature in a first direction, guides light emitted from a light source and incident from an incident surface, redirects the guided light by an optical path changer to thereby emit the guided light from an exit surface, and forms an image in a space, and a second region that has a predetermined curved surface, wherein the mold comprises a first member forming the first region and a second member forming the second region, the method of manufacturing comprising:

manufacturing the first member by bending a first electroforming stamper, on which a predetermined structure is formed by electroforming, in a direction corresponding to the first direction, manufacturing the second member to form the predetermined curved surface, and manufacturing the light guide plate by injection molding with use of the mold in which the first member and the second member are connected.

2. The method for manufacturing a light guide plate according to claim 1, wherein the second member is manufactured by a mold part including a surface for forming the predetermined curved surface.

3. The method for manufacturing a light guide plate according to claim 1, wherein the second member is manufactured by bending a second electroforming stamper formed by electroforming, in the first direction and a direction different from the first direction.

4. A light guide plate manufactured by the method according to claim 1.

5. A lighting tool for vehicle comprising:

the light guide plate according to claim 4;

a light source configured to emit light to the light guide plate; and a cover protecting the light guide plate and the light source.

6. A light guide plate manufactured according to the method of manufacturing of claim 1.

7. The light guide plate according to claim 6, wherein the second region includes an optical path changer that redirects the light, which is emitted from the light source and incident from the incident surface, to thereby emit the light from the exit surface, and forms an image in a space, and the optical path changer included in the second region has a density that is smaller than a density of the optical path changer included in the first region.

8. The light guide plate according to claim 6, wherein the second region includes an optical path changer that redirects the light, which is emitted from the light source and incident from the incident surface, to thereby emit the light from the exit surface, and forms an image in a space, and the optical path changer included in the second region has a density equal to or less than 50% of a density of the optical path changer included in the first region.

9. The light guide plate according to claim 7, wherein a pattern shape of the optical path changer included in the first region is different from a pattern shape of the optical path changer included in the second region.

10. The light guide plate according to claim 7, wherein the light redirected by the optical path changer included in the second region forms an image on the exit surface of the second region.

11. A light guide plate manufactured by the method according to claim 2.

12. A light guide plate manufactured by the method according to claim 3.

13. A lighting tool for vehicle comprising:

the light guide plate according to claim 11;

a light source configured to emit light to the light guide plate; and a cover protecting the light guide plate and the light source.

14. A lighting tool for vehicle comprising:

the light guide plate according to claim 12;

a light source configured to emit light to the light guide plate; and a cover protecting the light guide plate and the light source.

15. The light guide plate according to claim 7, wherein the optical path changer included in the second region has a density equal to or less than 50% of a density of the optical path changer included in the first region.

16. The light guide plate according to claim 15, wherein a pattern shape of the optical path changer included in the first region is different from a pattern shape of the optical path changer included in the second region.

17. The light guide plate according to claim 7, wherein the light redirected by the optical path changer included in the second region forms an image on the exit surface of the second region.

18. The light guide plate according to claim 8, wherein the light redirected by the optical path changer included in the second region forms an image on the exit surface of the second region.

19. The light guide plate according to claim 15, wherein the light redirected by the optical path changer included in the second region forms an image on the exit surface of the second region.

20. The light guide plate according to claim 16, wherein the light redirected by the optical path changer included in the second region forms an image on the exit surface of the second region.

* * * * *